(12) United States Patent
Edwards et al.

(10) Patent No.: US 8,760,166 B2
(45) Date of Patent: Jun. 24, 2014

(54) RESONANT ASSEMBLY, SYSTEM AND METHOD FOR IDENTIFICATION OF A BURIED ASSET

(75) Inventors: David John Edwards, Oxford (GB); Christopher John Stevens, Oxford (GB); Tong Hao, Oxford (GB); Harvey John Burd, Oxford (GB)

(73) Assignee: Isis Innovation Limited, Oxford (GB)

( * ) Notice: Subject to any disclaimer, the term of this patent is extended or adjusted under 35 U.S.C. 154(b) by 50 days.

(21) Appl. No.: 13/516,131

(22) Filed: Jun. 14, 2012

(65) Prior Publication Data

US 2013/0257434 A1 Oct. 3, 2013

Related U.S. Application Data

(63) Continuation of application No. PCT/GB2010/052097, filed on Dec. 15, 2010.

(30) Foreign Application Priority Data

Dec. 15, 2009 (GB) .................................... 0921872.8

(51) Int. Cl.
*G01V 3/08* (2006.01)
(52) U.S. Cl.
USPC .......................................................... 324/329
(58) Field of Classification Search
USPC ............................................. 324/67, 326–329
See application file for complete search history.

(56) References Cited

U.S. PATENT DOCUMENTS

| | | | | |
|---|---|---|---|---|
| 5,045,368 A | * | 9/1991 | Cosman et al. | ............... 428/34.1 |
| 5,510,769 A | | 4/1996 | Kajifez | |
| 5,517,179 A | * | 5/1996 | Charlot, Jr. | ................. 340/572.2 |
| 5,680,106 A | | 10/1997 | Schrott | |
| 6,724,310 B1 | | 4/2004 | Gershenfeld | |
| 6,879,161 B2 | * | 4/2005 | Rowan | ........................... 324/329 |
| 2003/0231020 A1 | | 12/2003 | Yonezawa | |
| 2007/0018649 A1 | * | 1/2007 | Prsha et al. | .................... 324/326 |
| 2008/0129622 A1 | | 6/2008 | Freeland | |
| 2012/0043826 A1 | * | 2/2012 | Saitoh | ........................... 307/104 |

FOREIGN PATENT DOCUMENTS

| | | |
|---|---|---|
| EP | 0556910 A1 | 8/2003 |
| WO | 2009/101450 A1 | 8/2009 |
| WO | WO 2009101451 A1 * | 8/2009 ............... H04Q 9/00 |

OTHER PUBLICATIONS

Paredes Sanchez, Luis-Miguel, Notification of the International Search Report and the Written Opinion of the International Searching Authority, PCT/GB2010/052097, Feb. 2, 2012, 12 pages, European Patent Office International Searching Authority, The Neatherlands.
Athina Nickitas-Etienne, International Preliminary Report on Patentability, PCT/GB2010/052097, Jun. 19, 2012, 8 pages, The International Bureau of WIPO, Switzerland.
Watt, John, Patents Act 1977: Search Report under Section 17, GB0921872.8, Apr. 13, 2010, 1 page, Intellectual Property Office, United Kingdom.
Jennings, Stephen, Patents Act 1977 Examination Report under Section 18(3), Application No. GB1212088.7, Aug. 8, 2012, 2 pages, Intellectual Property Office, United Kingdom.

* cited by examiner

*Primary Examiner* — Jay Patidar
(74) *Attorney, Agent, or Firm* — Crain, Caton & James

(57) ABSTRACT

A resonant assembly for identification of a buried asset comprising first and second resonant members each configured to resonate at a respective different resonant frequency when excited by an electromagnetic field. The resonant assembly is arranged to cause a near-field coupling of transmit and receive antenna of a detector at the first and second resonant frequencies such that identification of the resonant assembly is performed at least in part according to the frequencies of the coupling.

19 Claims, 9 Drawing Sheets

RESONANT ASSEMBLY, SYSTEM AND METHOD FOR IDENTIFICATION OF A BURIED ASSET

This application is a continuation of PCT Patent Application No. PCT/GB2010/052097 filed on Dec. 15, 2010, which claims priority to GB 0921872.8 filed on Dec. 15, 2009, the priority to which is hereby claimed.

FIELD OF THE INVENTION

The present invention relates to apparatus for detecting assets and to a method of detecting assets. In particular but not exclusively the invention relates to apparatus and a corresponding method for detecting buried assets.

BACKGROUND

Determining a location and identity of a buried asset without accurate written records can be a challenging task. In some cases, determination of the location is performed by systematically digging holes in ground until the asset is found. In other cases, ground penetrating radar (GPR) is used, assets being located by detecting a signal reflected by the asset. (Reference to GPR includes radiation having a frequency in the range of from around 200 MHz to around 1 GHz).

Use of GPR for locating buried assets suffers the disadvantage that radiation can be reflected by a number of features of a volume of ground, including variations in moisture content, solids composition, the presence of wildlife, and voids formed for example by tunnelling wildlife. Thus it can be difficult to reliably identify a location of a buried asset.

Acoustic techniques have also been used to identify buried assets and found to suffer similar disadvantages to GPR techniques.

It is also known to attach a radio frequency identification tag (RFID tag) to a non-buried asset such as items for sale in a store in order to enable identification of the asset using a suitable RFID tag reader. Typically, an RFID tag is placed in an inductive RF magnetic field to induce a flow of electrical current in the tag. The flow of current is used to generate an RF transmission by the tag to the reader.

Inductive magnetic fields are mostly in the near field, however, and the use of such RFID tag systems to locate and identify assets more than a few meters from the reader is generally not easy.

In the case of buried assets the problem is exacerbated since inductive RF electromagnetic waves are more strongly attenuated by soils than by air.

More recently, far-field RFID technology has been developed. However, RFID readers are incapable of generating sufficiently large excitation signals to detect RFID tags at depths below a surface at which many assets of commercial interest are buried.

U.S. Pat. No. 3,769,623 discloses a dichroic plate for passing radiation within a particular frequency band and reflecting radiation outside of that frequency band. The dichroic plate has slots provided therein dimensioned to pass radiation of a selected frequency.

U.S. Pat. No. 5,837,926 discloses mines having tuned passive electromagnetic resonants to enhance radar detection.

The UK HSE (Health Safety and Executive) Enforcement Policy for Replacement of Iron Gas mains 2006 has developed legally binding requirements on the UK gas distribution network operators for the replacement of ageing cast iron gas mains pipes with pipes formed from plastics materials.

However, current methods used to trace plastics-based pipes are either inefficient or very expensive. This hampers replacement and repair operations leading to unnecessary delays. Excavations often result in accidental damage to third party assets, casualties and traffic congestion. Furthermore, the Traffic Management Act and Records Code of Practice for buried assets largely suffer from inaccurate records.

It is desirable to enhance the visibility of buried assets such as plastics pipes.

SUMMARY OF THE INVENTION

Aspects of the inventions are defined in the appended claims.

In a first aspect of the invention there is provided a resonant assembly comprising first and second resonant members, the first and second resonant members each being configured to resonate at a respective different resonant frequency when excited by an electromagnetic field, wherein at least one resonant member comprises a discontinuous loop having at least one capacitive element connected between free-ends of the loop.

In a second aspect of the invention there is provided a system comprising a resonant assembly according to the first aspect, and a detector apparatus arranged to generate an electromagnetic field, to determine a near-field coupling of the electromagnetic field between a transmit and a receive antenna and to identify a buried asset associated with the resonant assembly at least in part according to a resonant frequency of the first and second members based on the coupling.

In a third aspect of the invention there is provided method of determining an identity of a buried asset, comprising generating an electromagnetic field from a transmit antenna to excite first and second resonant members of a resonant assembly, the first and second resonant members each being configured to resonate at a respective different resonant frequency, wherein at least one resonant member comprises a discontinuous loop having at least one capacitive element connected between free-ends of the loop; determining a near-field coupling of the electromagnetic field to a receive antenna at a plurality of frequencies of the electromagnetic field; and identifying the resonant assembly at least in part according to a frequencies of the coupling.

In a further aspect of the invention there is provided a resonant assembly comprising first and second resonant members, the first and second members each being configured to resonate at a respective different resonant frequency when excited by an electromagnetic field.

It is to be understood that each resonant member may respond to exposure to an electromagnetic field by acting effectively as a source of more than one frequency of electromagnetic radiation (e.g. harmonics of a fundamental frequency). However the assembly is arranged such that a characteristic response of two or more respective resonant members of the assembly to exposure to oscillating electromagnetic fields is different in the frequency domain. It is to be understood that this allows each assembly to be provided with a characteristic signature upon exposure to an oscillating electromagnetic field.

Thus in some embodiments a resonant assembly is provided that is an entirely passive assembly not having active components such as a microprocessor. Furthermore some embodiments of the invention do not have electrical nonlinearities as in the case of diodes which show strong nonlinear behaviour. Furthermore some embodiments of the invention do not comprise data storage elements.

Still furthermore some embodiments of the invention do not have a frequency shifting approach to bi-directional communications.

Embodiments of the invention may be arranged to detect a coupling of the assembly and to determine a difference between frequencies detected. By measuring the difference between frequencies rather than absolute frequency the apparatus can account for shifts in frequency due for example to soil conditions and other factors.

Thus embodiments of the invention provide an assembly having a simultaneous multi-frequency electromagnetic response. Embodiments of the invention enable a location of a buried asset to be determined together with identification of the buried asset.

Embodiments of the invention enable a low cost resonant assembly to be buried together with an asset below ground.

By providing a plurality of resonant members of different respective resonant frequencies each asset (and/or each reference position of the asset) can be provided with a unique identification code constructed in the frequency domain. Thus, the type of buried asset detected may be identified from the unique code.

For example, a buried utility asset such as a pipe or other conduit relating to water, gas, electric power, telecommunications infrastructure or any other service can be identified by the frequency response of the resonant members of the asset to external electromagnetic field excitation.

In some embodiments of the invention a time domain response may be used to provide a measure of a depth of an asset below ground.

Embodiments of the invention have application in environmental sensing and civil engineering enabling detection of leaks, detection of chemicals and monitoring of the state of buried assets such as integrity of the asset.

Assemblies arranged to respond to signals in a frequency range such as relatively high frequencies (e.g. GHz regime) may become difficult to detect in the presence of high levels of moisture, for example where leakage of water has occurred from a pipe, soaking the soil surrounding the assembly with water. This is at least in part because water is known to reflect electromagnetic radiation in the GHz regime, the reflected signal due to the assembly becoming obscured by a reflected signal due to moisture in the soil.

Operation at frequencies that are not strongly reflected by water is therefore preferable in some applications.

For these applications relatively low frequency operation is preferred in some circumstances. Thus resonant assemblies having resonant members arranged to resonate at a frequency in the kHz regime may be used in such applications. The regime may extend into the low-MHz regime, such as below 10 MHz.

In some embodiments an assembly comprising 2, 3, 4, 5, 6, 7, 8, 9, 10 or more resonant members may be provided.

Each resonant member of the assembly may comprise an inductive portion and a capacitive portion.

Each resonant member may comprise an inductive portion and a capacitive portion coupled in series.

Preferably the inductive portion comprises a conductive portion in the form of a loop.

Preferably the inductive portion comprises a conductive portion comprising a plurality of loops.

The loops may be substantially coaxial.

The inductive portion may comprise a coil of wire.

The capacitive portion may be coupled between free ends of the inductive portion.

The resonant members may be substantially coaxial.

Alternatively one selected from amongst two and three of the resonant members may be substantially orthogonal to one another.

In a second aspect of the invention there is provided a component comprising an assembly according to the first aspect.

The component may comprise a connector member arranged to connect lengths of pipe to one another.

The connector member may comprise an aperture through which material or substances passing through the pipe also pass.

The inductive portion of at least one resonant member may be arranged to loop around the aperture of the connector member.

The inductive portion may comprise an electrofusion heating wire.

Preferably a capacitor is coupled between free ends of the electrofusion heating wire.

In a further aspect of the invention there is provided a buried asset comprising an assembly according to the first aspect.

In a further aspect of the invention there is provided a support member having a plurality of assemblies according to the first aspect coupled thereto, the support member being arranged to be provided within a buried asset.

Preferably the support member comprises a flexible member arranged to be bent around one or more corners of a buried pipeline asset.

The support member may comprise a cable.

In a further aspect of the invention there is provided apparatus for detecting a buried asset comprising: an assembly according to another aspect; means for generating an electromagnetic field arranged to excite the assembly at a resonant frequency of each of the plurality of resonant members of the assembly; and means for detecting a near-field coupling of each of said plurality of resonant members.

The apparatus may be arranged to generate a signal having frequencies arranged to be responded to by the first and second resonant members.

The apparatus may be arranged to provide an output corresponding to the frequencies of electromagnetic signal detected.

The apparatus may be arranged to provide an output corresponding to a depth of an assembly below ground based on a time taken for a response of a resonant assembly and/or a phase of a resulting signal.

The apparatus may be arranged to provide an output corresponding to a relative depth of each of a plurality of assemblies below ground based on a time taken for a response of each assembly.

In a further aspect of the invention there is provided a method of detecting a buried asset comprising the steps of: burying together with the asset a resonant assembly comprising first and second resonant members, the first and second resonant members each being configured to resonate at a respective different resonant frequency when subjected to an electromagnetic field oscillating at a corresponding frequency; exposing the buried asset to the electromagnetic field and detecting a coupling of the assembly thereby to determine a location of the asset.

Preferably the method comprises the step of directing the electromagnetic field into ground at different respective locations until a signal having frequencies corresponding to the first and second resonant members is detected whereby the location of the asset is determined.

The method may further comprise the step of determining a depth of the asset based on a time taken for a signal to be detected following the step of directing the signal into the ground.

The step of burying the resonant assembly may comprise the step of providing an elongate flexible member to which the assembly is coupled and installing the flexible member in the asset.

The method may comprise the step of installing the flexible member in the asset after the asset has been buried.

The elongate flexible member may comprise a cable.

The asset may comprise a heating wire, the method comprising the step of forming at least one resonant member by connecting a capacitive element between free ends of the heating wire.

The method may comprise the step of providing a component having an assembly having a plurality of resonant members according the first aspect, the method comprising the step of forming at least one resonant member by connecting a capacitive element between free ends of the heating wire of the component.

Thus it is to be understood that in some embodiments of the invention use is made of a conducting loop provided with a length of pipe or a connector member. For example, some connector members are provided with one or more wires embedded in a wall of the connector member, opposed free ends of the wire being exposed to allow contact (such as electrical contact) to be made therewith. In some embodiments a capacitor is coupled between the free ends to form a resonant member. It is to be understood that a value of a capacitance of the capacitor may depend on a value of electrical resistance of the wire.

The electrical wire may be provided with the pipe, connector member or other component for the purpose of allowing an electrofusion joint to be formed by passing a current through the wire to heat the component. Electrical wires provided for other purposes are also useful use in forming a resonant member.

It is to be understood that in some embodiments the assembly may be arranged to respond to a near-field electromagnetic signal such as that provided by an inductive field.

In a further embodiment of the invention there is provided a method of detecting a buried asset comprising the steps of: burying together with the asset a resonant assembly comprising first and second resonant members, the first and second resonant members each being configured to resonate at a respective different resonant frequency when excited by an electromagnetic signal of a corresponding frequency; and launching into ground an electromagnetic signal, the signal having frequencies arranged to be resonant frequencies of the first and second resonant members.

BRIEF DESCRIPTION OF THE DRAWINGS

Embodiments of the invention will now be described with reference to the accompanying figures in which.

DETAILED DESCRIPTION

In one embodiment of the invention, a resonant assembly 105 according to an embodiment of the invention is embedded in a connector 101 (FIG. 1) arranged to connect two or more lengths of pipe to one another. In some embodiments the connector may be arranged to connect two lengths of pipe such that they are substantially co-linear with one another. In some embodiments the connector 101 may be arranged to connect two lengths of pipe such that they are substantially orthogonal to one another. Other types of connector 101 are also useful.

Figure 2A:
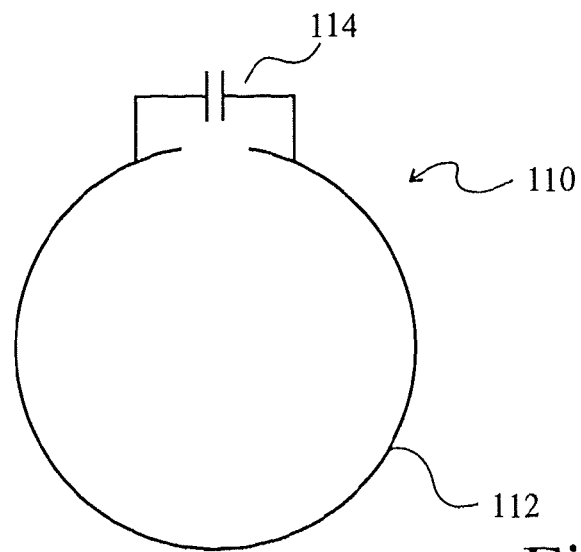
FIG. 2 shows (a) a schematic illustration of a resonant element and (b) an equivalent circuit of the resonant element.

Each resonant assembly 105 comprises a plurality of resonant members 110. FIG. 2(a) illustrates schematically a resonant member 110 according to an embodiment of the invention.

Figure 2B:
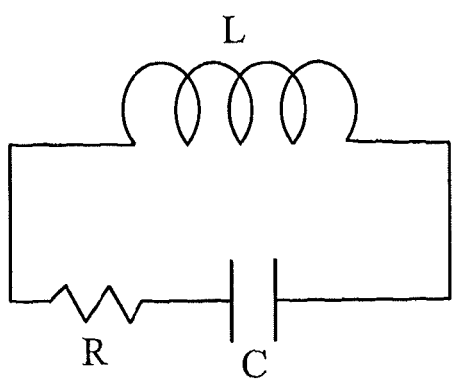

As shown in FIG. 2(a), each resonant member 110 has an electrically inductive portion in the form of a discontinuous loop 112 of conducting material such as wire, metallic bar or strip. A capacitive element 114 is coupled between free ends of the loop 112 thereby to form a resonator having inductance, capacitance and resistance. FIG. 2(b) shows an equivalent circuit of the resonant member.

Figure 1A:
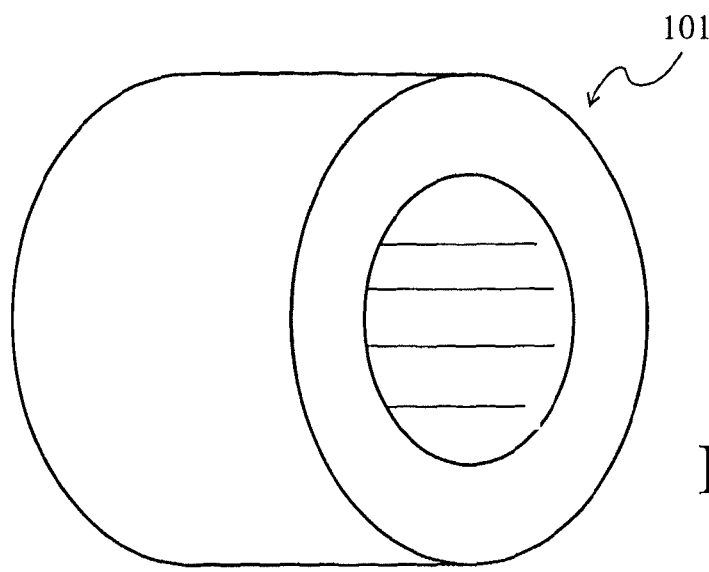
FIG. 1 is a schematic illustration of an assembly of resonant elements according to an embodiment of the invention provided in a pipe connector member in (a) perspective view and (b) cross-section.
Figure 1B:
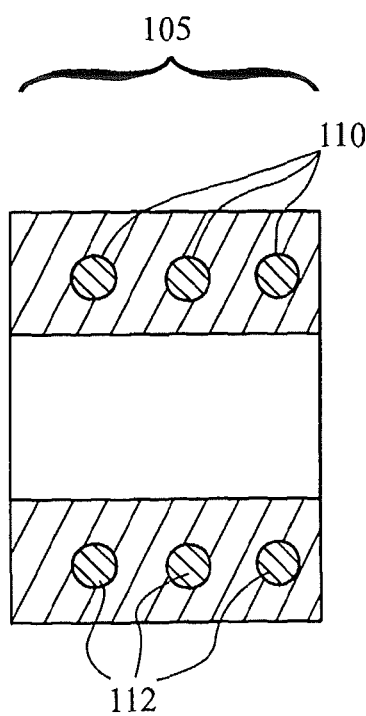

FIG. 1(b) shows a cross-section through the connector 101 of FIG. 1(a) showing three resonant members constituting the resonant assembly 105.

In the embodiment of FIG. 1 the resonant assembly 105 is integrated into the connector 101. It is to be understood that resonant assemblies 105 according to embodiments of the invention may be integrated into any other suitable article such as a pipe, a valve or a tag coupled to a buried asset.

In the embodiment of FIG. 1 the loop of conductive material 112 is substantially coaxial with the connector 101. Other arrangements are also useful.

Figure 3A:
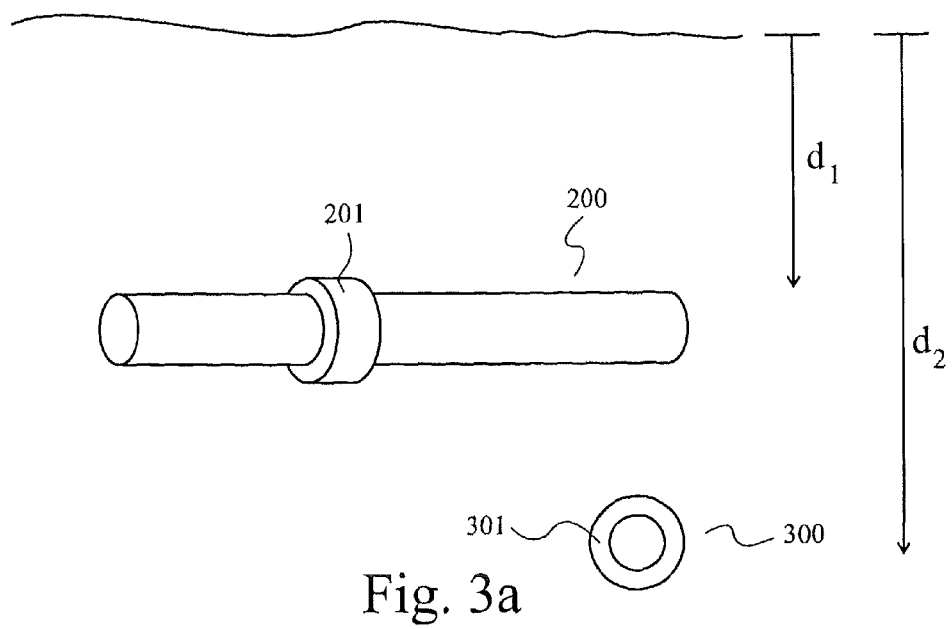
FIG. 3 is a schematic illustration of (a) a pair of buried pipeline assets each having an assembly of resonant elements coupled thereto and (b) a plot of frequency of an electromagnetic signal detected by a detector as a function of time.

FIG. 3(a) is a schematic illustration of a pair of buried assets in the form of a first pipeline 200 and a second pipeline 300. Each pipeline 200, 300 comprises a plurality of lengths of pipe coupled together by means of connectors 201, 301. Each connector 201, 301 has an assembly of resonant elements 110 embedded therein as described above and illustrated in FIG. 1.

The first pipeline 200 is buried a distance $d_1$ below ground, the second pipeline being buried a distance $d_2$ below ground where $d_2$ is greater than $d_1$.

Connector 201 has two resonant elements 110 embedded therein having respective resonant frequencies f2 and f4. Connector 301 also has two resonant elements 110 embedded therein, having respective resonant frequencies f1 and f3 where f4>f3>f2>f1.

Other arrangements of relative frequencies of resonant elements are also useful. In some embodiments the particular combination of resonant frequencies of an assembly associated with one pipeline are different from the particular combination of resonant frequencies of an assembly associated with another pipeline.

When it is required to determine where an asset is located, an electromagnetic signal is transmitted below the surface of ground and a detector arranged to detect a corresponding coupling of the resonant assembly below the surface of the ground.

Figure 3B:
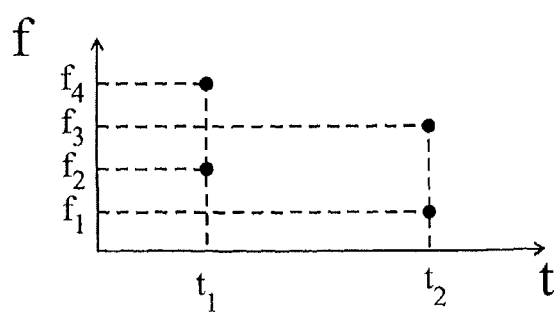

FIG. 3(b) shows a plot of frequency of a signal received by a receiver as a function of time. It can be seen from FIG. 3(b) that connectors 201, 301 associated with the first and second pipelines 200, 300 respectively can be readily distinguished by their unique combination of resonant members of different respective resonant frequencies.

Furthermore, the relative depths of the connectors 201, 301 (and thereby the pipelines 200, 300) can be determined based on the relative times taken for the signals to be detected at the surface. It is to be understood that in general the deeper below ground an asset is located the longer the time taken for a signal to return to the surface from the resonant assembly. The depth may also be determined based on a phase of the received signal.

Thus, in some embodiments a frequency domain response of an assembly provides information on a type of asset (e.g. whether the asset is a water pipe, a gas pipe or an electrical conduit) whilst the time domain or phase response provides information in respect of the depth below ground at which the asset is located.

In one embodiment of the invention a computer software application is provided that is arranged to receive data corresponding to a frequency of signals detected by the receiver. The application provides an output corresponding to an identity of the asset based on the received data. Other arrangements are also useful. For example, in some embodiments the software application is arranged to receive data corresponding to relative values of frequency of signals detected by the receiver.

Relatively low frequency electromagnetic signals may be used, such as in the kHz and low MHz region i.e. below 10 MHz. Advantageously, these frequencies of radiation penetrate to buried assets more easily. Embodiments of the invention are configured for detection using near field radiation, such as within one wavelength of a transmitter.

In one embodiment of the invention, a chain of assemblies of resonant elements are provided, the assemblies being coupled to a support member arranged to be provided within a buried asset such as a pipe.

In one embodiment the support member is arranged to be installed in a pipeline asset buried below ground after installation of the asset. The support member may be a flexible support member such as a conduit, a cord, a cable or any other suitable support member.

In use the member may be pulled through the pipeline such that it is provided along at least a portion of a length of the pipeline, the assemblies of resonant members coupled to the support member being arranged to respond to electromagnetic signals incident on the pipeline.

It is to be understood that pipelines may be formed from materials that are substantially transparent to oscillating electromagnetic fields in the frequency ranges used to irradiate the assemblies. In some embodiments the pipelines are formed from plastics materials. By installing the resonant members within the pipeline, a need to dig an access hole in order to provide a resonant assembly at or near an external surface of the pipeline may be avoided. By 'transparent' is meant that a field is able to pass through a wall of the pipeline with sufficiently low attenuation (if any) to allow coupling of the signal by the assembly back through the wall of the pipeline.

Figure 4:
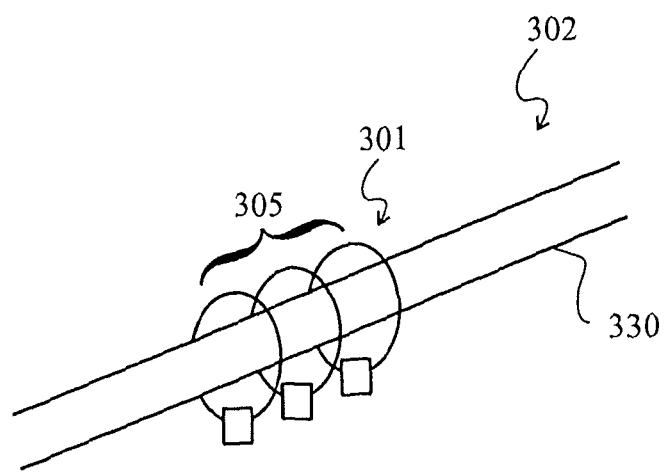
FIG. 4 shows an assembly of three substantially coaxial resonant members.

FIG. 4 shows a portion of a chain of assemblies 302 in which one of many assemblies 305 is shown coupled to a cable 330 arranged to be provided in a pipeline asset.

Figure 5:
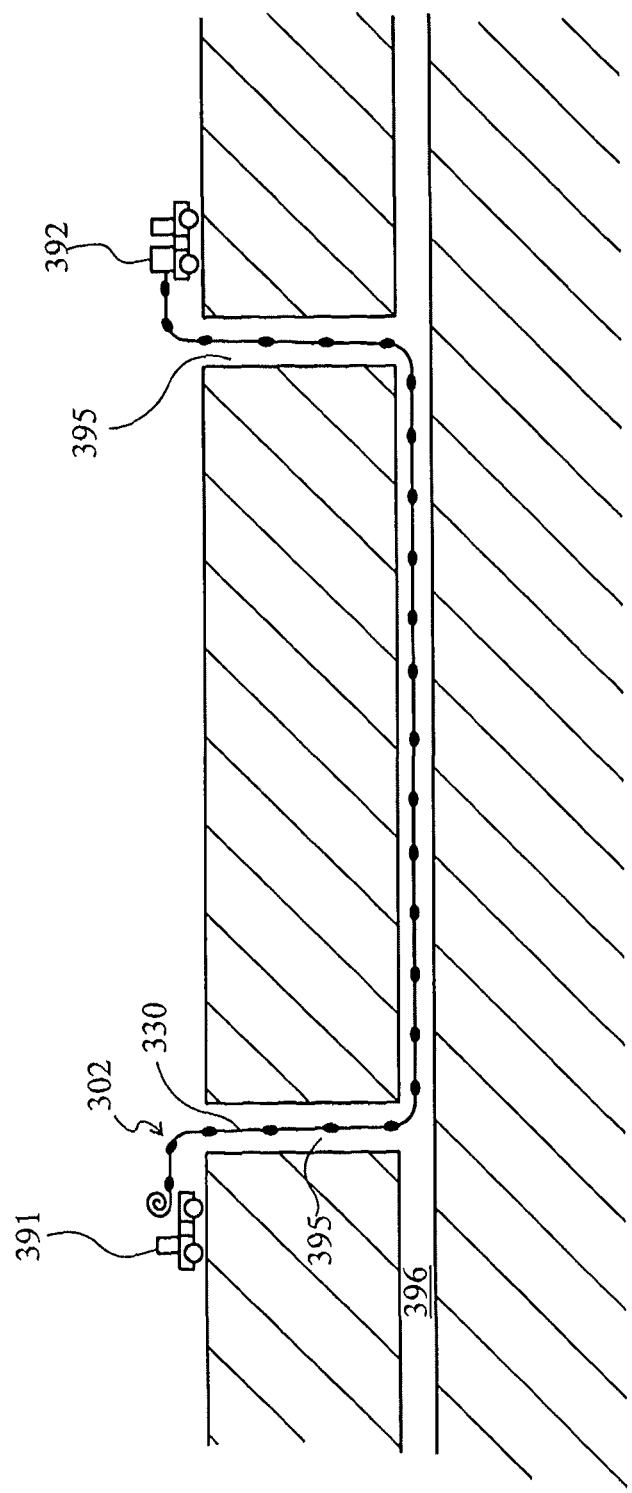
FIG. 5 shows a cable having assemblies of resonant members coupled thereto at spaced apart locations along a length thereof.

FIG. 5 shows a configuration of a pipeline installation in which a chain of assemblies 302 has been installed in a buried pipeline 396. The pipeline 396 has access shafts 395 arranged to allow access to the buried pipeline 396 from a surface of the ground. The pipeline 396 is formed from a plastics material that allows electromagnetic radiation at the frequency at which the assemblies 305 of the chain 302 are arranged to resonate to pass through a wall of the pipeline 396.

Similarly, the frequency at which the assemblies 305 of the chain 302 are arranged to resonate is arranged to be different from a frequency of electromagnetic radiation reflected by a substance or medium to be passed through the pipeline 396.

It is to be understood that the assemblies 305 will typically be provided within a moisture impermeable housing thereby to prevent electrical short circuiting of the resonant elements and to prevent corrosion or other damage.

In some embodiments one or more assemblies 305 are coupled to a discrete article such as a rod or other article arranged to be inserted in a pipeline 396.

Thus, some embodiments of the invention allow a buried pipeline asset to be provided with an assembly of resonant members for the purpose of location determination and identification without a requirement to dig multiple access holes.

Figure 6:
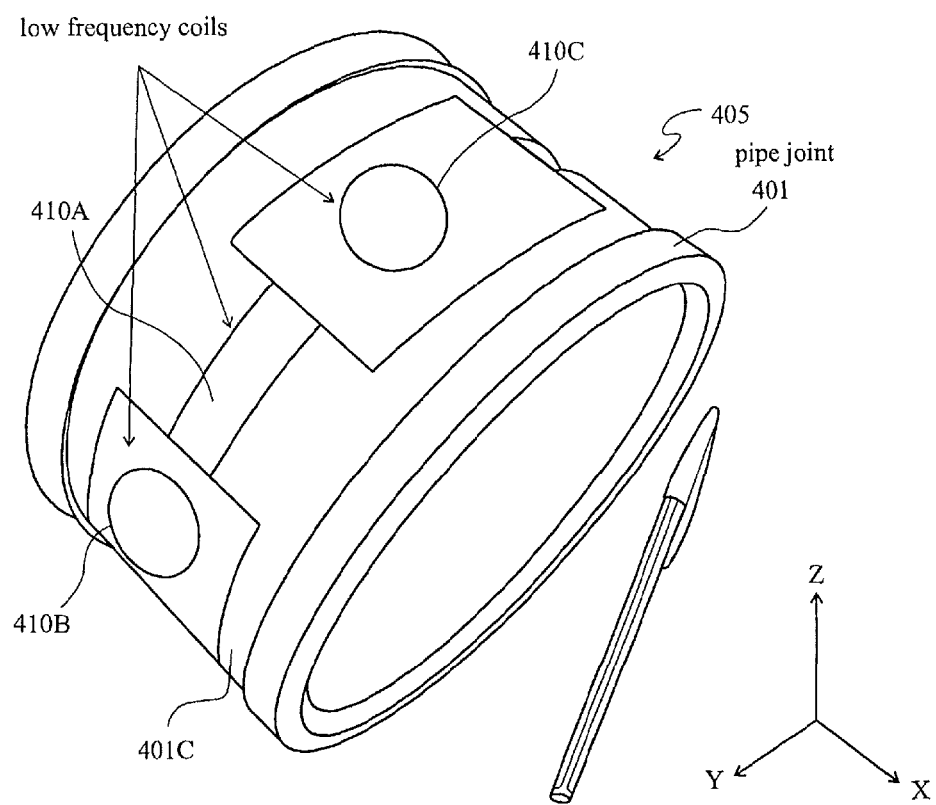
FIG. 6 shows a further connector member having a resonant assembly having three resonant members, each of the resonant members being oriented at mutually orthogonal angles with respect to one another.

FIG. 6 shows a connector 401 having three resonant members 410A, 410B, 410C arranged in mutually orthogonal orientations thereby to form an assembly 405 according to an embodiment of the invention. Each resonant member 410A, 410B 410C has a substantially flat coil of wire with a capacitor coupled between free ends of the wire. In some embodiments the free ends of the wire are coupled directly to one another without the presence of a capacitor therebetween.

It can be seen that a first coil 410A is arranged to be substantially coaxial with the connector 401, being formed around an outer circumferential surface 401C of the connector 401.

Second and third coils 410B, 410C are coupled to the connector outer circumferential surface 401C at angular positions that are substantially 90° apart, the coils 410B, 410C being oriented substantially tangential to the outer circumferential surface 401C.

This arrangement has the advantage that in some applications a visibility of the assembly 405 to electromagnetic radiation is increased.

Figure 7A:
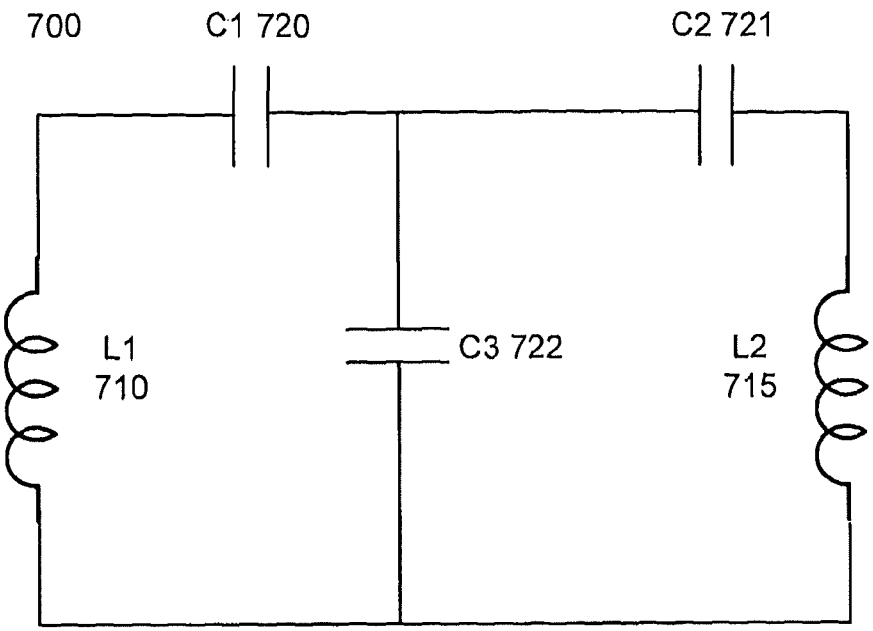
FIG. 7 shows further assemblies of resonant elements according to embodiments of the invention.
Figure 7B:
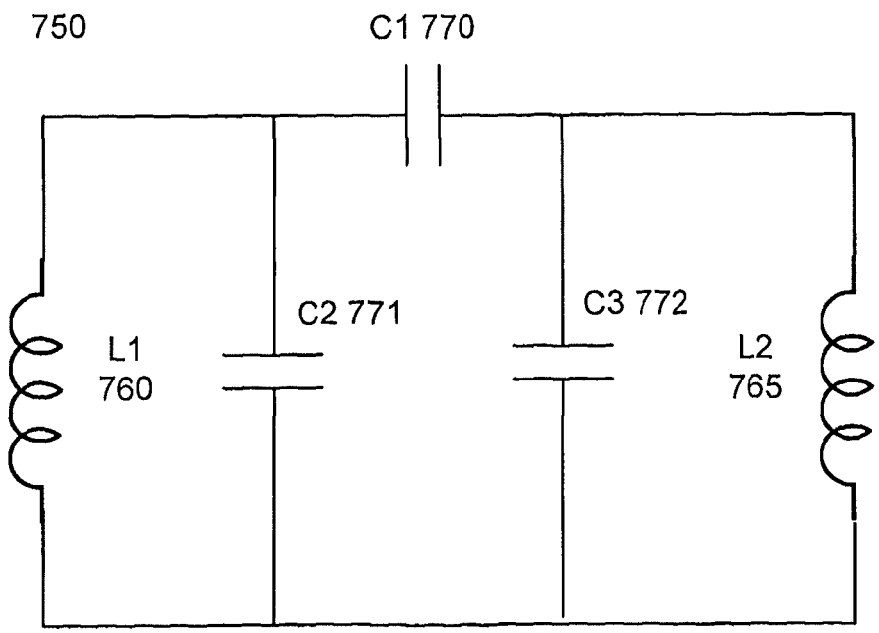

FIG. 7 schematically illustrates two resonant assemblies according to embodiments of the invention. A first resonant assembly 700 is shown in FIG. 7(a) and a second resonant assembly 750 is shown in FIG. 7(b). Each of the resonant assemblies 700, 750 comprises a discontinuous loop 710, 760 for receiving an electromagnetic signal transmitted by a detector apparatus. Each resonant assembly 700, 750 has two resonant frequencies, as will be explained, which enables, at least in part, identification of a buried asset associated with each resonant assembly.

Referring to FIG. 7(a), the first resonant assembly 700 comprises the discontinuous loop 710 responsive to the electromagnetic signal transmitted by the detector apparatus. By discontinuous it is meant that free ends of the loop 710 are connected to other circuit elements forming the resonant assembly 700. The circuit elements may be reactive circuit elements i.e. as opposed to active circuit elements, such as a microprocessor or the like. The loop 710 may comprise a plurality of loops i.e. the loop may form a coil having a plurality of turns of conductive material, such as wire, for receiving the electromagnetic signal transmitted from the detector. The loop 710 is an inductive element, as represented in FIG. 7(*a*). In some embodiments, only the loop 710 directly receives the electromagnetic signal from the detector. Other circuit elements present in each assembly are responsive to the electromagnetic signal received by the loop 710. However, substantially only the loop 710 acts as a receiving element for the electromagnetic signal. In use, the loop 710 is inductively i.e. near-field coupled to transmitting and receiving coils of the detector apparatus such that the apparatus may identify the two resonant frequencies of the assembly 700.

The first resonant assembly 700 comprises first, second and third capacitors 720, 721, 722 and an inductor 715. When viewed into the inputs of the circuit provided to the loop 710, the second capacitor 721 is in series with the inductor 715, both of which are in parallel arrangement with the third capacitor 722. The circuit formed by the second and third capacitors 721, 722 and the inductor 715 is in series with the first capacitor 720. The first, second and third capacitors 720, 721, 722 and the inductor 715 may be formed by surface mount components. It may be observed that a discontinuous loop is formed by the loop 710 and the capacitive elements 720, 722. A second discontinuous loop may also be considered to be formed by the inductor 722 and capacitive elements 721, 722. It will be realised that equivalent circuits to that shown in FIG. 7(*a*) may be formed by other arrangements of reactive components.

As mentioned above, in the resonant assembly 700 the loop 710 is directly responsive to the transmit and receive coils of the detector and the assembly is configured to have two resonant frequencies corresponding to two normal modes. In order to achieve this, a voltage induced in the loop 710 should excite both modes. In some embodiments, the induced voltage in the loop 710 should excite both modes generally equally. In some embodiments, this is achieved by setting values of predetermined reactive components to be generally equal.

In the circuit shown in FIG. 7(*a*), substantially equal excitation of both modes is achieved by setting C1 (720)=C2 (721) and L1 (710)=L2 (715). The first and second resonant frequencies of the assembly 700 are then given as:

$$\text{freq\_1} = \frac{1}{2\pi}\sqrt{\frac{1}{L1 \times C1}}$$

$$\text{freq\_2} = \frac{1}{2\pi}\sqrt{\frac{(1 + 2 \times C3/C1)}{L1 \times C1}}$$

Referring to FIG. 7(*b*) a second embodiment of resonant assembly 750 is shown. As in the first embodiment 700, the assembly 750 comprises a discontinuous loop 760 for inductive coupling to the detector. The assembly also comprises first, second and third capacitors 770, 771, 772 and an inductor 765. As seen from the ends of the loop 760, the inductor 765 and third capacitor 772 are arranged in parallel, the combination of which is in series with the first capacitor 770. The assembly comprising the first and third capacitors 770, 771 and inductor 765 is in parallel with the second capacitor 771. Again, the assembly may be considered to comprise first and second discontinuous loops each formed by an inductor and capacitive elements. As with the first embodiment, substantially equal excitation of both modes is achieved by setting C1 (770)=C2 (771) and L1 (760)=L2 (765). The first and second resonant frequencies of the assembly 750 are then given by:

$$\text{freq\_1} = \frac{1}{2\pi}\sqrt{\frac{1}{L1 \times C1}}$$

$$\text{freq\_2} = \frac{1}{2\pi}\sqrt{\frac{1}{L1 \times C1(1 + 2 \times C3/C1)}}$$

It can be observed that for the resonant assemblies 700, 750 the first resonant frequency is determined by the inductance of the loop 760, forming a first inductor in the assembly, and the first capacitor 770. The second resonant frequency is then, given equal values of the inductance of the loop 760 and first capacitor 770, is determined by setting the value of the third capacitor 772 to control the ratio of C3/C1 and consequently the ratio of the first and second resonant frequencies, as shown below for the second resonant assembly 750 where the inductances of the loop 760 and inductor 765 are generally equal, although a similar relationship may be derived for the first resonant assembly:

$$\text{freq\_1} = \frac{1}{2\pi}\sqrt{\frac{1}{L1 \times C1}}$$

$$\text{freq\_2} = \frac{\text{freq\_1}}{\sqrt{(1 + 2 \times C3/C1)}}$$

For example, for the second resonant assembly shown in FIG. 7(*b*), setting the first resonant frequency to 1.34 MHz, the value of the third and first capacitors can be set to be C3/C1=0.9, such that the second resonant frequency is 800 kHz. It can be appreciated that the first resonant frequency is higher in frequency than the second resonant frequency.

Figure 8:
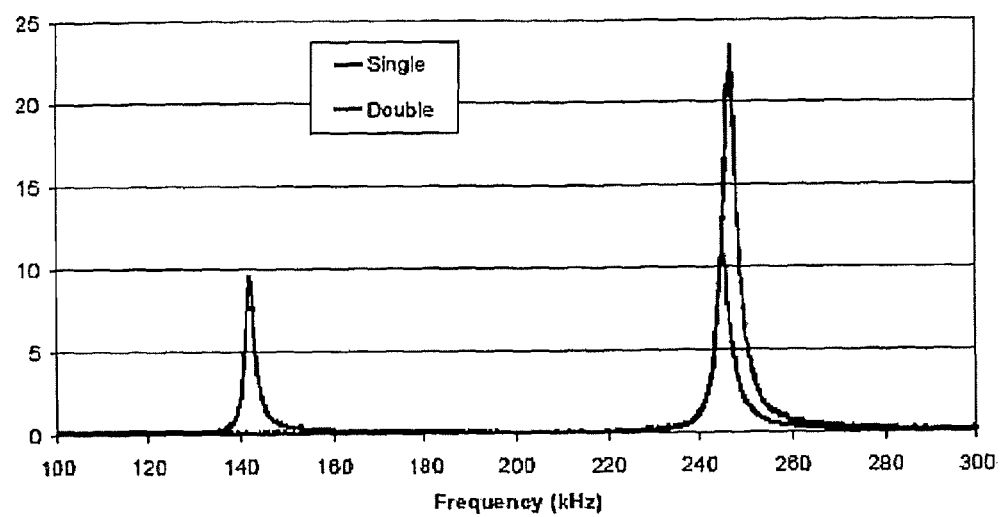
FIG. 8 illustrates a response of resonant assemblies of the invention.

FIG. 8 illustrates a frequency response of resonant circuits of embodiments of the invention. A resonant assembly having a single resonant frequency is denoted with numeral 810. A response of a resonant assembly, such as that shown in FIG. 7, having two resonant frequencies is also shown wherein 820 identifies the first, higher, resonant frequency and 830 identifies the second, lower, resonant frequency. It will be realised that the resonant frequencies shown are merely for the purpose of illustration and that other values of resonant frequency may be determined.

From FIG. 8 it can be appreciated that a magnitude of response of a resonant assembly having two resonant frequencies is lower than that of a single-frequency resonator. However, as described above, reactive component values may be selected such that the magnitude of response of the two frequency resonant assembly may be generally equal at the first and second resonant frequencies 820, 830.

The resonant frequencies may be selected to be between 200 kHz and 3 MHz and, in some embodiments, between 250 kHz and 2 MHz, although it will be realised that other frequency ranges may be chosen. In order to identify a buried asset, a plurality of predetermined resonant frequencies may be chosen and the value of the first and second resonant frequencies of the resonant assemblies selected from amongst those resonant frequencies. For example, 15 resonant frequencies may be determined and the resonant frequencies of the assemblies shown in FIG. 7 chosen from amongst the those 15 frequencies, although it will be realised that other numbers of predetermined resonant frequencies may be used. In this example, 105 combinations of resonant frequency assemblies may be derived.

Embodiments of the invention may be designed for operation it a variety of depths i.e. a below-surface depth. For example an assembly 700, 750 may be designed for operation at up to 1.5 m depth, wherein the loop 710, 760 is approximately 15 cm diameter. Other embodiments may be designed for use at a depth up to 2 m or 3 m having loops of proportionally larger diameter. The diameter and number of coils present in each loop 710, 760 may be determined by considering a composition or material expected between and/or around the assembly 700, 750 and the detector.

The assembly 700, 750 may be arranged within a protective case or material suitable for attachment to a buried asset, such as a pipe, cable or other asset.

Figure 9:
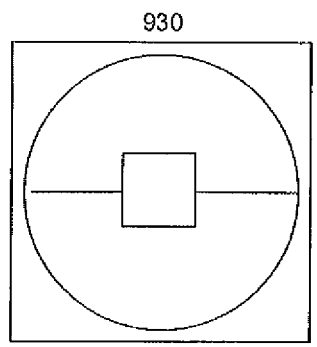
FIG. 9 shows a system according to an embodiment of the invention.
Figure 9:
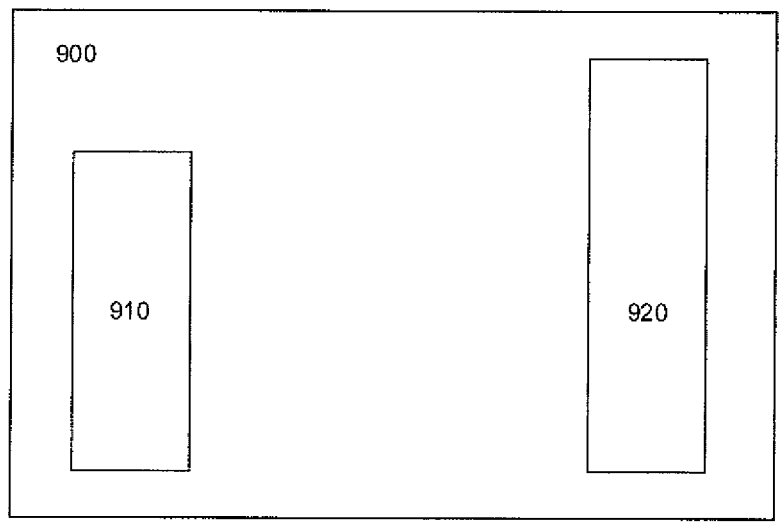

FIG. 9 illustrates a detector apparatus 900 in relation to a resonant assembly 930, such as that shown in FIG. 7. Embodiments of the invention are configured for detecting buried assets using near field operation of the detector 900. In particular, the detector 900 detects the presence and resonant frequencies of the assembly 930 based on a magnetic coupling of the assembly to a receive antenna or coil of the apparatus, as will be explained.

The detector comprises a transmit coil 910 and a receive coil 920. The transmit and receive coils 910, 920 may be substantially equally sized or may be unequally sized.

In the absence of the assembly 930, there is a background (mutual) coupling of magnetic flux lines between the transmit 910 and receive 920 coils which may be minimised either by geometric means (positioning the coils 910, 920) or electronically (e.g. by generating an electronic cancelling signal). The detector 900 may be arranged to sweep across a predetermined frequency spectrum, such as the frequency ranges discussed above, or may be arranged to sequentially operate at a plurality of predetermined frequencies, such as the predetermined frequencies from amongst which resonant frequencies of the assembly 930 may be chosen.

In the presence of the assembly 930, i.e. when the detector 900 is within a near-field operating range of the assembly 930, the minimised state is disrupted owing to the assembly 930 intercepting (or coupling) flux and causing magnetic flux to couple from the transmitter coil 910 into the receiver coil 930. The magnitude of this effect depends on the size of the loop 710, 760, which affects the number of flux lines intercepted, and also the depth of the assembly 930 which also effects the phase of the resulting coupled signal. The transmit field induces electromotive force in the assembly loop 710, 750 and the assembly 930 in turn generates its own identical frequency magnetic field. This generated field in turn induces its own electromotive force in the receive coil 920 which enables the detector 900 to detect the presence or absence of the assembly 930 and to identify the resonant frequencies of the assembly 930, thereby enabling identification of the buried asset.

The larger the coils, including the transmit and receive coils 910, 920 and the loop 710, 760 of the assembly 930, the deeper the detectable effect (more flux coupling). However, there is a practical limit to the workable size of the transmit/receive coils 910, 920 of the apparatus 900. In some embodiments of the invention, the transmit 910 and receive 920 coils of the apparatus are of differing size. The differing sizes provides an optimisation route to increase the effect of the flux unbalancing by the assembly 930 while reducing the total size of the detector 900 (the transmit/receive coil pair 910, 920). This increases the detectable depth of the resonant assembly 930 (for a given size) while reducing the needed increase in total size of the detector 900. Thus the cost of the assembly 930 has been reduced and the overall size of the detector 900 is limited. In some embodiments, the receive coil 920 is larger than the transmit coil 910. The receive coil may be generally about twice the size of the transmit coil in some embodiments.

In some embodiments, the identity of the buried asset may be determined solely based on the plurality of resonant frequencies of the resonant assembly. For example, the identity of the buried asset may be determined by comparing the plurality of resonant frequencies against a database of resonant frequency information associated with buried assets. However, depending upon the number of buried assets to be identified, and a resolution of frequency detection possible, in some embodiments of the invention the identification of a buried asset is also based on geographic location information. For example, in an embodiment of the invention where a resonant assembly has first and second resonant frequencies selected from amongst a plurality of resonant frequencies (in the described example 15 possible resonant frequencies provide 105 combinations of resonant frequency) the identification of the buried asset is partly based on the geographic location information. The geographic location information may be derived from received wireless signals, such as GPS signals.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

We claim:

1. A resonant assembly for identification of a buried asset, comprising first and second resonant members, the first and second resonant members each being configured to resonate at a respective different resonant kHz regime frequency when excited by an electromagnetic field, wherein at least one resonant member comprises a discontinuous loop having at least one inductive element and at least two capacitive elements connected between the free-ends of the loop, such that the assembly is configured to resonate at first and second resonant frequencies in the kHz regime when the loop is excited by the electromagnetic field to thereby cause a near-field coupling of transmit and receive antenna of a detector at the first and second frequencies.

2. The resonant assembly of claim 1, wherein the at least one inductive element and at least two capacitive elements are arranged such that the first resonant member comprises a first resonant circuit formed by the loop and at least one capacitive element arranged to resonant at the first resonant frequency and the second resonant member comprises a second resonant circuit formed by the inductive element and at least one capacitive element arranged to resonant at the second resonant frequency.

3. The resonant assembly of claim 2, wherein capacitive values of the at least two capacitive elements and inductive values of the loop and at least one inductive element are selected such that excitation of the loop by the electromagnetic field excites first and second resonant modes of the assembly substantially equally.

4. The resonant assembly of claim 2, wherein the at least one inductive element and at least two capacitive elements connected between the free-ends of the loop are arranged such that the first and second resonant frequencies have a predetermined relationship.

5. The resonant assembly of claim 4, wherein the predetermined relationship is in a predetermined ratio.

6. The resonant assembly of claim 2, wherein the apparatus comprises only one loop for exciting by the electromagnetic field.

7. The resonant assembly of claim 2, wherein the first resonant frequency is determined according to the equation:

$$freq = \frac{1}{2\pi}\sqrt{\frac{1}{L1 \times C1}}$$

wherein L1 is an inductance of the loop and C1 is a capacitance of a first capacitive element of the at least two capacitive elements connected to the free-ends of the loop.

8. The resonant assembly of claim 7, wherein the second resonant frequency is determined according to the equation:

$$freq = \frac{1}{2\pi}\sqrt{\frac{(1 + 2 \times C3/C1)}{L1 \times C1}}$$

or $$freq = \frac{1}{2\pi}\sqrt{\frac{1}{L1 \times C1(1 + 2 \times C3/C1)}}$$

wherein C3 is a capacitance of a second capacitive element of the at least two capacitive elements connected to the free-ends of the loop.

9. The resonant assembly of claim 1, wherein the assembly includes a plurality of loops of a conductive material.

10. The resonant assembly of claim 1 arranged within an enclosure for attachment to the buried asset.

11. The resonant assembly of claim 1, wherein the resonant assembly is for near-field coupling to transmit and receive antennas.

12. The resonant assembly of claim 1, wherein the loop has a diameter of 15 cm or larger.

13. A system comprising:
a resonant assembly comprising first and second resonant members, the first and second resonant members each being configured to resonate at a respective different resonant frequency when excited by an electromagnetic field, wherein at least one resonant member comprises a discontinuous loop having at least one capacitive element connected between free-ends of the loop; and
a detector apparatus arranged to generate an electromagnetic field, to determine a near-field coupling of the electromagnetic field between a transmit antenna and a receive antenna and to identify a buried asset associated with the resonant assembly at least in part according to a resonant frequency of the first and second members based on the coupling.

14. The system of claim 13, wherein the transmit and receive antenna of the detector apparatus are generally unequally sized.

15. The system of claim 14, wherein the receive antenna is substantially larger than the transmit antenna.

16. The system of claim 14, wherein the receive antenna is approximately twice a size of the transmit antenna.

17. A method of determining an identity of a buried asset, comprising:
generating an electromagnetic field from a transmit antenna to excite first and second resonant members of a resonant assembly associated with a buried asset, the first and second resonant members each being configured to resonate at a respective different resonant kHz regime frequency, wherein at least one resonant member comprises a discontinuous loop having at least one capacitive element connected between free-ends of the loop;
determining a near-field coupling of the electromagnetic field to a receive antenna at a plurality of the kHz regime frequencies of the electromagnetic field; and
identifying the resonant assembly at least in part according to a frequencies of the coupling.

18. The method of claim 17, comprising comparing the first and second resonant frequencies against a database of resonant frequency information associated with buried assets.

19. The method of claim 17, further comprising determining geographic location information for a location of the buried asset and identifying the resonant assembly at least in part according to the geographic location information.

* * * * *